(12) United States Patent  
Alameh et al.

(10) Patent No.: US 6,212,414 B1  
(45) Date of Patent: Apr. 3, 2001

(54) WRIST-CARRIED RADIOTELEPHONE

(75) Inventors: Rachid M. Alameh, Schaumburg; Eric L. Krenz, Crystal Lake; Michael W. Schellinger, Arlington Heights, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/379,761

(22) Filed: Aug. 24, 1999

(51) Int. Cl.$^7$ .................................................. H04B 1/38
(52) U.S. Cl. ............................ 455/575; 455/90; 455/347
(58) Field of Search ......................... 455/575, 90, 348, 455/346, 347; 379/428, 430, 433; 368/10

(56) References Cited

U.S. PATENT DOCUMENTS

| | | | |
|---|---|---|---|
| 3,032,651 | 5/1962 | Gisiger-Stähli et al. | 250/14 |
| 3,971,206 | 7/1976 | Martino | 58/88 |
| 3,973,706 | 8/1976 | Boyce et al. | 224/4 |
| 4,141,074 | 2/1979 | Popper | 364/705 |
| 4,194,355 | 3/1980 | Nishida | 368/282 |
| 4,334,315 | 6/1982 | Ono et al. | 455/11 |
| 4,419,770 * | 12/1983 | Yagi et al. | 455/301 |
| 4,427,303 | 1/1984 | Matthias | 368/282 |
| 4,754,285 | 6/1988 | Robitaille | 343/718 |
| 4,821,532 | 4/1989 | Jaques et al. | 63/3 |
| 4,847,818 | 7/1989 | Olsen | 368/10 |
| 4,885,802 * | 12/1989 | Ragan | 455/344 |
| 4,928,206 * | 5/1990 | Porter et al. | 361/385 |
| 4,972,394 | 11/1990 | DiMarco | 368/227 |
| 5,008,864 | 4/1991 | Yoshitake | 368/10 |
| 5,088,072 * | 2/1992 | Fitzmorris | 368/69 |
| 5,235,560 | 8/1993 | Seager | 368/10 |
| 5,235,561 | 8/1993 | Seager | 368/10 |
| 5,239,521 | 8/1993 | Blonder | 368/10 |
| 5,265,265 * | 11/1993 | Hama et al. | 455/300 |
| 5,467,324 * | 11/1995 | Houlihan | 368/10 |
| 5,559,760 * | 9/1996 | Schneider | 368/10 |
| 5,615,179 | 3/1997 | Yamamoto et al. | 368/281 |
| 5,721,783 * | 2/1998 | Anderson | 381/68.6 |
| 5,819,183 * | 10/1998 | Voroba et al. | 455/550 |
| 5,872,744 | 2/1999 | Taylor | 368/13 |
| 5,886,669 * | 3/1999 | Kita | 343/718 |
| 5,889,737 * | 3/1999 | Alameh et al. | 368/204 |
| 5,960,085 * | 9/1999 | De La Huerga | 380/25 |
| 5,960,366 * | 9/1999 | Duwaer | 455/556 |

FOREIGN PATENT DOCUMENTS

| PCT/US90/ 04263 | 3/1991 | (WO) | H05K/11/00 |
|---|---|---|---|

* cited by examiner

*Primary Examiner*—William Cumming  
*Assistant Examiner*—C. Chow  
(74) *Attorney, Agent, or Firm*—Brian Mancini

(57) ABSTRACT

A wrist-carried radiotelephone, operable without removing from a user's wrist, includes a housing including a display and a battery, and a wristband having a plurality of rigid and flexing portions. The flexing portions mechanically connect the rigid portions. The wristband is electrically and mechanically coupled to the housing. The radiotelephone circuitry is distributed within the rigid portions of the wristband and is interconnected through the flexing portions of the wristband. The circuitry is coupled to the display and the battery through the wristband.

14 Claims, 3 Drawing Sheets

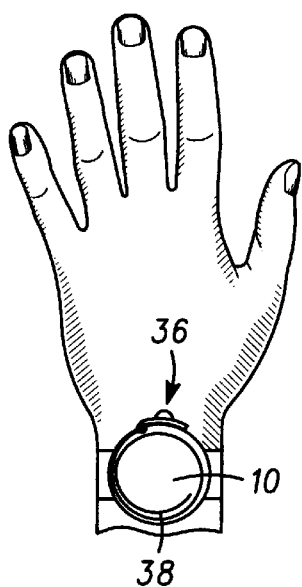
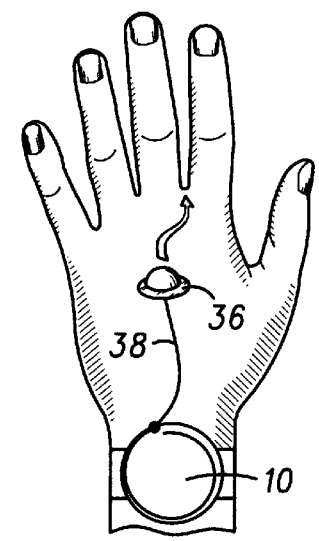
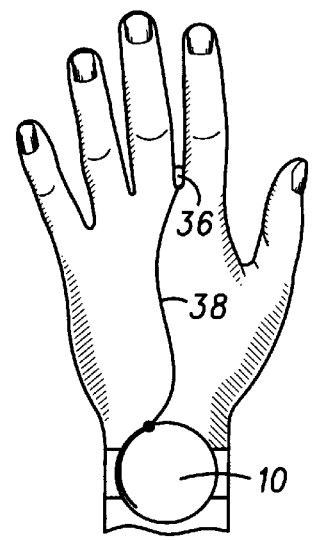
FIG.3  FIG.4  FIG.5
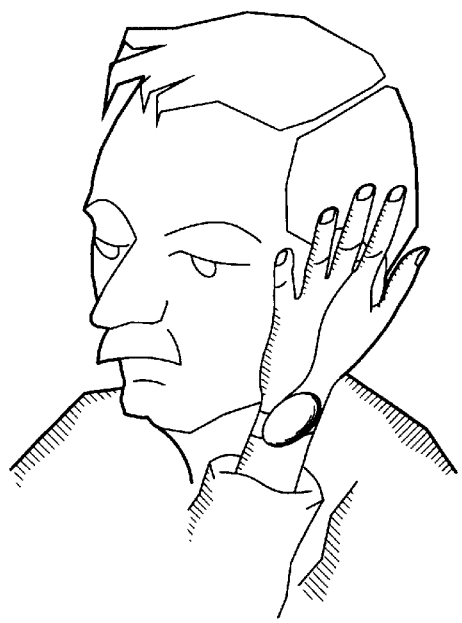
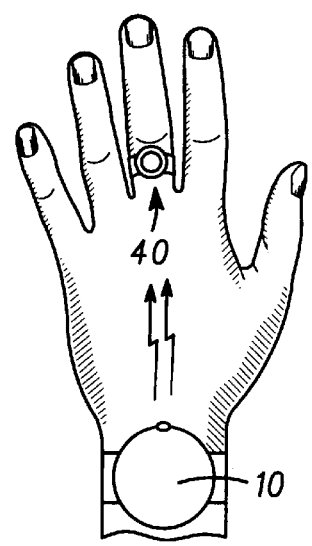
FIG.6  FIG.7

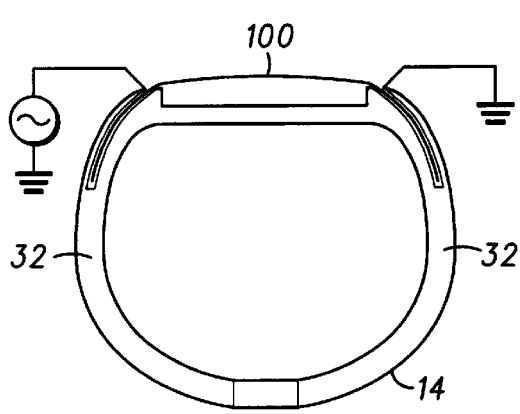
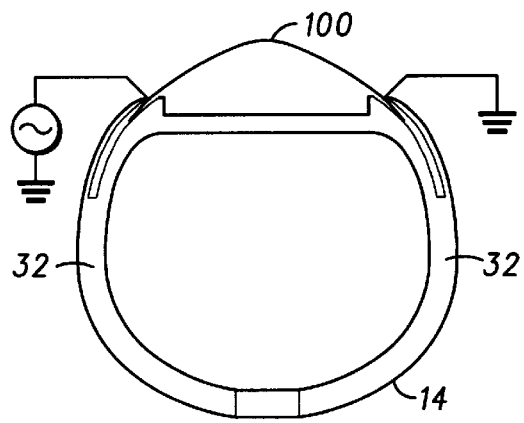
FIG.8  FIG.9
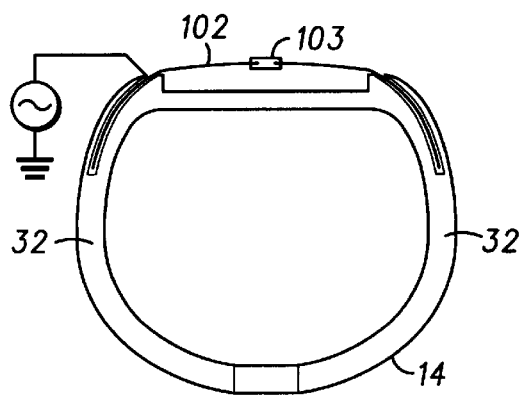
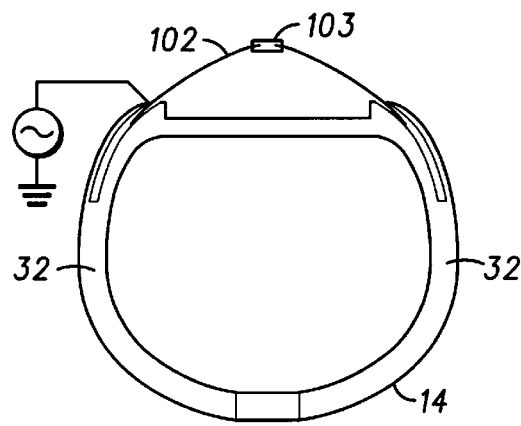
FIG.10  FIG.11
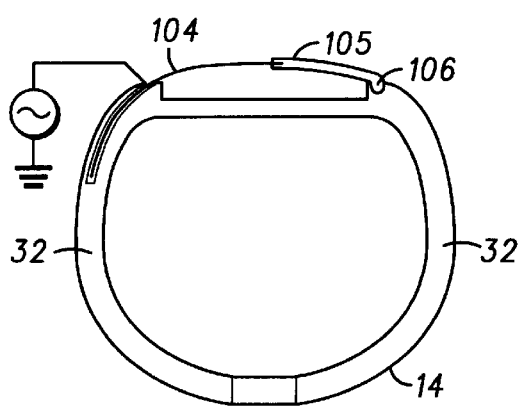
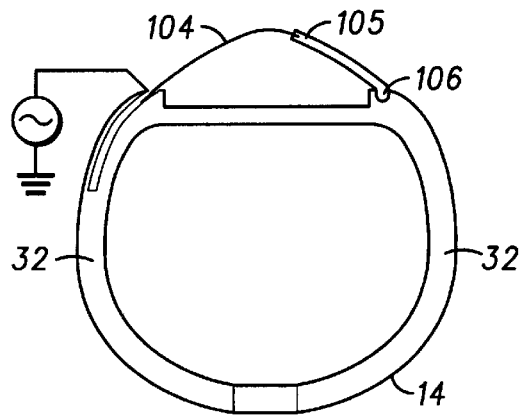
FIG.12  FIG.13

WRIST-CARRIED RADIOTELEPHONE

FIELD OF THE INVENTION

The present invention relates generally to wrist-carried radiotelephones, and more particularly to a circuit arrangement for a wrist-carried radiotelephone.

BACKGROUND OF THE INVENTION

Consumer markets continue to request smaller portable electronic devices that have greater functional features. Examples of such devices include two-way and broadcast radio receivers (i.e., Walkman®), compact disc players, cellular telephones, and computer devices to name but a few. As portable electronic devices have become smaller, a variety of carrying means have been developed. These carrying means have included belt-mounted carrying cases that have gained particular acceptance in applications such as portable radios and compact disc players. Further, as such devices have become smaller, they have become more compatible with wearing in more convenient places, such as, for example, on the wrist. An example of this type of device, might be, for example, a one-way call receiver, such as a portable paging device. Pagers that are worn on the wrist have long been incorporated into wristwatch type devices. In these devices, the pager and the watch are an integral unit. Radiotelephones, however, have much more circuitry than a pager and require more power. Prior art efforts to incorporate radiotelephone circuitry and a battery into this type of integral unit results in a device that is bulky and unattractive. In addition, the placement of the battery often makes it difficult to replace. Radiotelephones that are bulky and hard to use have not found success in the marketplace.

The marketplace also demands that radiotelephones have a privacy-mode of operation. The size and location of a wrist carried radiotelephone is not amenable to a straightforward location for a speaker and microphone that matches the hand-mount-ear arrangement and spacing in a comfortable manner. Most prior art wrist telephones require removing the unit from the wrist in order to utilize a private-mode of operation, thereby occasioning damage and inconvenience to the user, and presents a safety issue when driving. One solution to this (U.S. Pat. No. 5,008,864) is to pass sound waves from a speaker in the radiotelephone through a hollow tube extending to the user's ear. However, this hollow tube is bulky, is carried separately from the watch presenting issues of losing or damaging the tube, and must account for attenuation of the sound waves through the tube and any kinks in the tube. Another solution (U.S. Pat. No. 5,239,521) describes the microphone or speaker being placed on a short boom. However, this solution only provides a short range of ear-mouth spacing that is cumbersome and awkward to use.

Accordingly, there is a need for a wrist-carried radiotelephone that can be comfortably operated without removing it from the wrist. There is also a need for a wrist-carried radiotelephone that provides an easy-to-use privacy mode of operation. It would also be an advantage to provide an easily changeable battery without removing the radiotelephone from the wrist. It would also be beneficial to provide a device that is not bulky, can be worn easily, and has an aesthetic appearance.

BRIEF DESCRIPTION OF THE DRAWINGS

FIGS. 3–5 show a top view illustrating the wired earpiece operation of the present invention;

FIG. 6 shows a perspective view illustrating the wired earpiece operation of the present invention;

FIG. 7 shows a top view illustrating the wireless earpiece operation of a preferred embodiment of the present invention; and FIGS. 8–13 illustrates cross-sectional views of various antenna embodiments, in accordance with the present invention.

DETAILED DESCRIPTION OF THE PREFERRED EMBODIMENTS

Figure 1:
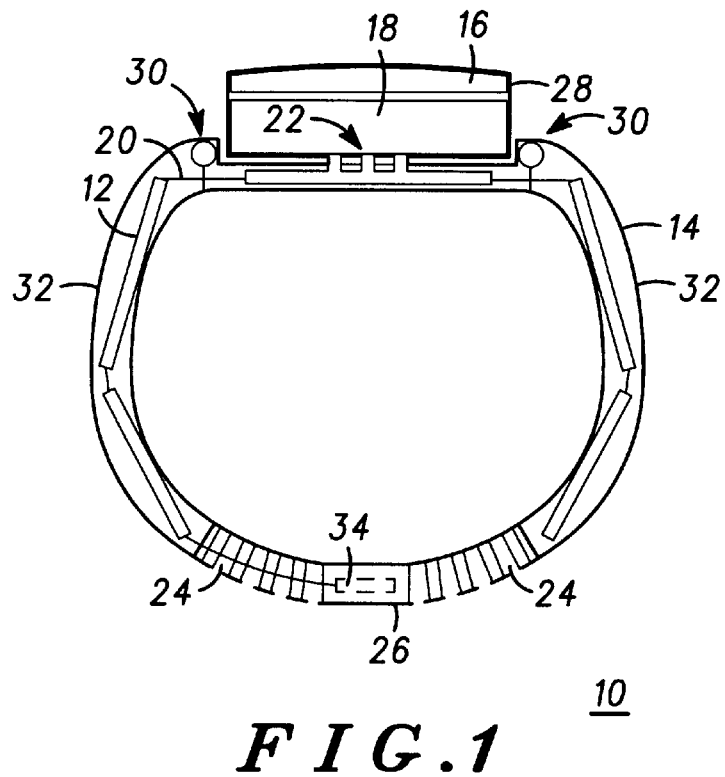
FIG. 1 illustrates a cross-sectional side view of a wrist-carried radiotelephone, in accordance with the present invention.

The present invention provides a wrist-carried radiotelephone that is easily and comfortably operated in private or non-private mode without removing it from the wrist. The configuration for the present invention includes the radiotelephone circuitry located within the wristband of the device such that the radiotelephone is not bulky, can be worn easily, and has an aesthetic appearance. This configuration also allows an easily changeable battery without removing the radiotelephone from the wrist.

While the specification concludes with claims defining the features of the invention that are regarded as novel, it is believed that the invention will be better understood from a consideration of the following description in conjunction with the drawing figures, in which like reference numerals are carried forward. A radiotelephone is a device which communicates information using electromagnetic waves in the radio frequency range. Wrist-carried means that a device is strapped to or otherwise secured to a person's wrist. Therefore, a wrist-carried radiotelephone is a radiotelephone adapted to be secured to a user's wrist to provide portable, lightweight and convenient access to radiotelephone communications.

The radiotelephone portion of the wrist-carried radiotelephone is preferably a cellular radiotelephone adapted for personal communication or personal computing, but may also be a cordless radiotelephone or a personal communication service (PCS) radiotelephone. The radiotelephone portion may be constructed in accordance with an analog communication standard or a digital communication standard. The radiotelephone portion generally includes a radio frequency (RF) transmitter, a RF receiver, a controller, an antenna, batteries, a duplex filter, a frequency synthesizer, a signal processor, and a user interface including at least one of a keypad, control switches, a display, an earpiece, and a microphone. The radiotelephone portion can also include a paging receiver. If the device incorporates a pager, there might be a small liquid crystal display and an audio annunciator. The electronics incorporated into a watch, or for that matter, a portable cellular phone, two-way radio or selective radio receiver, such as a pager, are well known in the art, and may be incorporated into the electronic unit.

Referring now to FIG. 1, there is illustrated a view of a wrist-carried radiotelephone 10, in accordance with the present invention. A plurality of segmented printed circuit boards 12 are disposed within a hollow portion of a curved section of a wristband 14. The printed circuit (PC) boards 12 carry radiotelephone circuitry as is known in the art. Although only five PC boards are shown, it should be recognized that a different number of PC boards could be used as well. Preferably, the PC boards 12 carry all of the radiotelephone circuitry excluding the antenna and user interface circuits such as a display 16, and a battery 18. The PC boards 12 can be rigid or flexible, and can be straight or curved. Preferably, the PC boards 12 are semi-flexible, and are substantially straight segments, as manufactured. The PC boards are interconnected with wires 20 to provide complete radiotelephone operation. Preferably, the wire interconnects are flex circuits as are known in the art.

The PC boards 12 are electrically coupled to a housing 28 through contacts 22. The PC boards can be exposed at the contacts or completely enclosed in the wristband 14. The housing 28 is mechanically connected to the wristband 14. The housing 28 contains a radiotelephone display 16 and at least one battery 18. The display 16 is hinged to allow easy removal of the battery 18 without removing the wristband 14 from the user's wrist. The battery 18 is used to provide power to the radiotelephone circuitry. The display is adapted to show the time and user interface functions of the radiotelephone. The display can additionally contain a keypad (not shown) or other user interface. The housing 28 is detachable from the wristband 14. As a result a new display style and color can easily be inserted at a minimum cost to a user.

Preferably, the wristband 14 includes hinges at flexing portions 30 at first ends of the rigid portions 32. The hinges are disposed between the rigid portions 32 and the housing 28 and pivotably couples the rigid portions 32 in the wristband 14. Optionally, more hinges can be located along the wristband 14. Second ends of the rigid portions 32 are secured together with a clasp 26. The wristband 14 also has at least one flexible adjustable portion 24, or sizing link, adjacent to the clasp 26 for providing a proper fit to the user's wrist. The wristband 14 has rigid 26,32 and flexing portions 24, 30. The flexing portions mechanically connecting the rigid portions. As a result, the wristband can be described as a flexible, segmented wristband.

In a preferred embodiment, the clasp contains electrical user interface circuits 34 electrically coupled to the radiotelephone circuitry of the PC boards. The user interface circuits 34 can include at least one of a microphone, an interface jack, a battery charging jack, and a subscriber identification module (SIM) holder/reader. This embodiment provides electrical connections between the clasp circuits and the PC boards through one or both of the flexible adjustable portions 24. Alternatively, one of the flexible adjustable portion 24 can be eliminated with the associated rigid portion 32 extending fully to the clasp so as to facilitate electrical connection therebetween.

The PC boards 12 are distributed within the rigid portions 32 of the wristband 14. The wiring interconnects 20 are located at the flexing portions 30 of the wristband 14. The flexing portions 30 comprise either hinges or elastic couplings and the wiring interconnects are position either through or around the flexing portions 30. The rigid portions 32 are preferably metal to provide inherent shielding for the PC boards 12. However, other rigid materials can be used as long as separate shielding is provided. It is preferred that two rigid portions 32 are used on either side of the housing 28. However, more rigid and flexible portions can be added such that each PC board is individually contained within a rigid portion and interconnected with flex circuits within flexing portions of the wristband. In this way the rigid portions can be considered as wristband links in the conventional sense. It is also preferred that only one adjustable portion 24 is used such that the PC boards 12 can be connected to further circuitry contained within the clasp 26. More preferably, the circuitry on the PC boards are mounted with PC board standoffs to isolate them from the rigid portions. Preferably, the rigid portions 32 are electrically coupled to ground. In addition, the flexing portions comprise hinges disposed between the rigid portions and allowing flexible circuit connection between the circuitry in each rigid portion.

Distributing the PC boards within a wristband has several advantages. Firstly, the distributed nature of the PC boards provides for a much lower profile than in prior art wrist radiotelephones that forced most or all of the components into a bulkier housing. Secondly, the PC boards themselves can be manufactured with less layers than in a standard radiotelephone. This reduces crosstalk problems and interference between circuits. Thirdly, the wristband can be configured to allow removal of the PC boards from the wristband. The distributed, segmented nature of the PC boards would allow the folding up of the segmented PC boards back against each other for installation into completely different devices with much different form factors, such as a pendant or necklace radiotelephone, for example, without altering the hardware. Fourthly, the housing can be changed to accommodate styling tastes at a low cost since the circuitry is wholly contained in the wristband. Fifthly, the low profile of the device allows more comfort for the user, and will not catch on a sleeve, as happens in bulkier devices.

Figure 2:
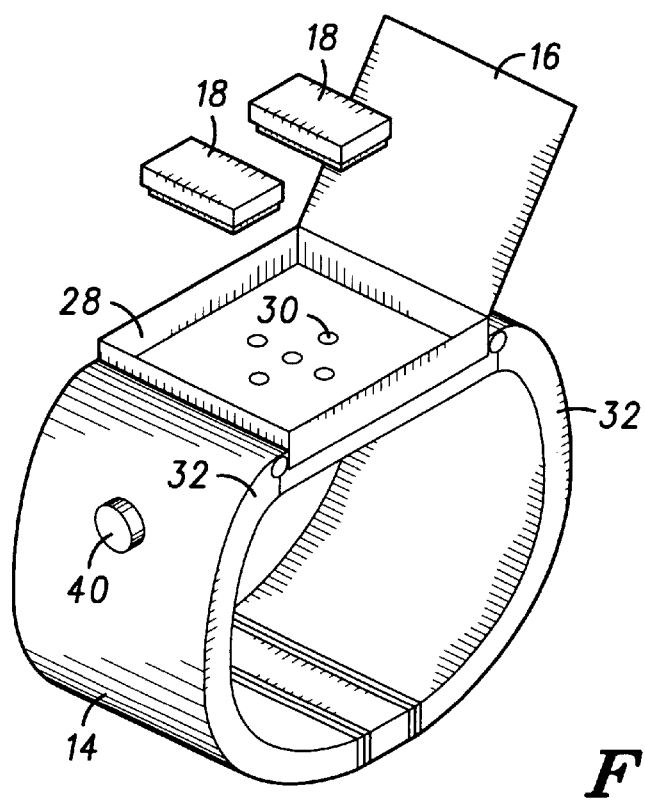
FIG. 2 illustrates a perspective view of the wrist-carried radiotelephone of FIG. 1.

FIG. 2 shows the display 16 being hinged within the housing 28 so as to facilitate removal of the at least one battery 18 while the user is wearing the wristband 14. Removal of the battery 18 simply involves opening the display 16 cover, either through a catch, latch or button, and removing the battery 18. Providing electrical contacts 30 within the housing 28 protects the electrical contacts 30 from the environment or user perspiration. The housing 28 also would contain any battery leakage that may occur. The configuration of the housing 28 and display 16 provide maximum flexibility in a wide variety of implementations and alterations, and yields optimum operation using the same hardware. Moreover, conventional sized batteries, such as button cells, which are readily available, can be used in the present invention. Convenient battery changing is important in the present invention as the batteries are much smaller than those available in standard cellular phones, and will need to be changed more often, even with the advent of exotic material technologies providing more powerful batteries, such as a lithium cell, for example. It is expected that a battery-housing configuration as described above can provide enough capacity (using a 23×23×6 mm Li-Polymer cell, for example) to power the radiotelephone circuitry for about one hour of conversation during a telephone call and for about twenty hours in a standby mode waiting to receive a call.

The wrist-carried radiotelephone can include some separate watch circuitry disposed in the housing 28, for providing a time of day, with or without a separate watch battery disposed in the housing 28 to provide power only to the watch circuitry or back-up power to the radiotelephone. Thus, in the event that the radiotelephone battery 18 is low on power or needs reserve power, the watch circuitry remains operational. In addition, a separate watch battery can be used to maintain the memory of the radiotelephone while charging or when changing its battery 18. A watch is a portable timepiece. Therefore, the wrist-carried radiotelephone 10 combines the functions of a portable timepiece and a radiotelephone into a single unit. However, preferably the radiotelephone uses its own internal timing to provide a clock function on the display 16 without need for separate watch circuitry. With the advent of voice recognition software there is no longer a need for a standard keypad. A microphone and possibly a knob or one or two keys (activate/deactivate and function key) would be needed. These keys could be located on the display, housing or wristband. However, a standard twelve-key keypad could be located on the display, housing or wristband. Further, the display could contain a touch screen that is menu driven.

Several modes of operation of the present invention can be used. Firstly, there are non-traditional modes of operation available such as internet access or game play. Another mode of operation permits non-private speaker phone operation where the user can hear the speaker without placing any device near the ear. However, the present invention provides a particular advantage in a privacy mode of operation wherein the radiotelephone does not need to be removed from the wrist to be operated. Although the radiotelephone of the present invention is usable removed from the wrist, this is a less desirable mode of operation, in that, it is counterintuitive to the watch concept.

In a first embodiment of a private mode of operation, a wired headset accessory, that provides one or both of a microphone and an earpiece, can be plugged into the wrist-carried radiotelephone, although a wireless version is also contemplated. In a second embodiment, private mode is provided by a wired or wireless earbud to be placed in the user's ear with a microphone placed on the wristband or housing of the radiotelephone.

In a third embodiment, the present invention provides a wired earpiece 36 coupled to the radiotelephone 10, and a microphone located in the clasp 26. In particular, the third embodiment includes an extendable earpiece 36 containing an electromechanical transducer disposed therein. The earpiece 36 is electrically and mechanically coupled to the wrist-carried radiotelephone 10 via a spring-retractable tether 38, comprising an electrical cord, that stows during standby, and is pulled out by the user during a call. FIGS. 3–5 illustrate the operation of the extendable earpiece 36 (the back of the hand, and the housing of the radiotelephone, facing up). FIG. 3 shows the earpiece 36 fully retracted within the radiotelephone 10. The retraction mechanism can be contained within the housing or wristband. FIG. 3 shows the retraction mechanism being in the housing, for example. FIG. 4 shows the earpiece 36 partially retracted within the radiotelephone 10. FIG. 5 shows the earpiece 36 almost fully extended from the retraction mechanism. In this embodiment, the earpiece 36 is formed to comfortably fit between the base of two fingers, near the palm. Alternatively, an earpiece holder can be shaped to fit on the end of one of the fingers. Advantageously, the retraction mechanism allows a comfortable fit for any sized hand, unlike devices in the prior art. This permits the user to hold the arm in a comfortable, natural position, with the earpiece near the ear and the microphone (not shown) in the clasp of the radiotelephone near the mouth, as represented in FIG. 6. It is also possible for the extension/retraction of the earpiece to serve as a hookswitch signal to activate/end a call.

FIG. 7 shows the hands free operation of a preferred embodiment of the present invention achieved by using a wireless infrared (IR) or RF piece 40. The piece 40 can be either an earbud to be placed in the user's ear or a ring to be worn on a finger and held in proximity to the user's ear. Optionally, the piece 40 can be stored in a cradle on the housing 28 or wristband 14 (as shown in FIG. 2) so that the secondary battery of the piece can be charged. During a call, the user removes the piece 40 from its cradle to answer the call. In these instances, the piece 40 is powered via an internal secondary rechargeable button cell that gets charged when the piece 40 is cradled on the radiotelephone. Alternatively, the piece 40 can be recharged in a separate battery charger. In the case of a ring for example, it can be worn on the finger until the user goes home where it is taken off and charged with a separate battery charger. Because the piece 40 is inexpensive to make (small and simple), a user can purchase multiple units, carry one, and leave the other behind to charge in a desktop charger at home, for example.

In this wireless implementation, a low power RF link can be used because body coupling between the watch and ring will be strong. However, it is also contemplated that each of the ring and watch can be used on different arms of the user, also. It is preferred that the piece 40 is an IR operable ring, as IR is harder to intercept due to its short range and therefore provides more secure communications. In addition, the location of the ring and radiotelephone is line15 of-sight further facilitating the use of an IR link. In operation, the radiotelephone performs similarly to that of the third embodiment. This embodiment also has the advantage of allowing a comfortable fit for any sized hand, and permits the user to hold the arm in a comfortable, natural position similar to that shown in FIG. 6. In addition, the user could have several different jewelry or ring accessories with different styles, so that one could be charging on the radiotelephone or separate charger while another is in use. It is also possible for the placement/removal of the ring from its cradle to serve as a hookswitch signal to activate/end a call.

The present invention also provides several different antenna configurations. In the third embodiment of the wired earpiece configuration presented above, it is preferred that the antenna is conveniently located within the retractable electrical cord (see FIGS. 3–5). This is unobtrusive to the user requiring no additional actions on their part. However, other accommodations for the antenna are also contemplated in the present invention. Most simply, the antenna can be concealed within a non-conductive portion of either the housing or wristband. This embodiment, although viable, would not provide maximum efficiency. Another possibility is to provide a protruding, extendable antenna as is provided in standard cellular phones. This too is viable but can become obtrusive to a user, interfering with arm motions or catching on clothes. The present invention provides for several non-protruding antenna configurations to resolve these difficulties.

FIGS. 8–13 show various antenna configurations usable in accordance with the present invention. The housing is not shown for clarity. These configurations can be stationary, or movable to provide increased efficiency.

FIG. 8 shows a half-loop antenna 100 having both ends stowed within the rigid sections 32 of the metal wristband 14. For a half-loop antenna 100, one end is driven where it partially extends into the wristband 14 and one end is grounded where it partially extends into the wristband 14. As shown, the antenna 100 does not protrude significantly above the radiotelephone. However, for maximum bandwidth and efficiency, the antenna 100 can be extended as shown in FIG. 9.

Alternatively, the antenna can be of a monopole type antenna 102 as shown in FIGS. 10 and 11. In this case the antenna 102 is driven at one end where it partially extends into the wristband 14 and is not conductively attached at the other end. The antenna is connected in the middle by a dielectric insulating coupling 103. The end of the antenna 102 opposite the feed would be non-conductive, serving only to tether the antenna 102 at a choice of two heights above the housing in the stowed (FIG. 10) and extended (FIG. 11) positions.

A dipole antenna 104 configuration is shown in FIG. 12 and 13, wherein one end of the antenna 104 partially extends into the wristband 14 and the other end is attached by a non-conductive tether 105 to a pivot 106 allowing the retraction (FIG. 12) or extension (FIG. 13) of the antenna 104 into the wristband.

With any of the above antenna configurations, one or both ends of the antenna can be variably loaded, based on whether the antenna is retracted or extended. In addition, it is preferred that the antenna is spring loaded at one or both ends to deploy when the user presses a release or simple removes the earpiece cradled on the wristband.

It is to be understood that the phraseology or terminology employed herein is for the purpose of description and not of limitation. Accordingly, the invention is intended to embrace all such alternatives, modifications, equivalents and variations as fall within the broad scope of the appended claims.

What is claimed is:

1. A wrist-carried radiotelephone operable without removing from a user's wrist, comprising:
    a detachable housing including a display and a battery, the housing, display and battery being detachable without removing the wrist-carried radiotelephone from the user's wrist;
    a wristband having rigid and flexing portions, the flexing portions mechanically connecting the rigid portions, the wristband being mechanically coupled to the housing;
    radiotelephone circuitry distributed within the wristband, the radiotelephone circuitry including circuit boards electrically interconnected by flexible interconnects contained within the rigid portions of the wristband, the circuitry being coupled to the display and the battery through the detachable housing; and
    a deployable antenna assembly that is mechanically coupled to the wristband on both sides of the detachable housing such that the antenna deploys in proximity to the detachable housing, the antenna is stowed in at least one rigid portion of the wristband on either side of the housing when not in use, and wherein when operating the radiotelephone the antenna is deployed out of the at least one rigid portion of the wristband such that the antenna assembly extends over the detachable housing.

2. The wrist-carried radiotelephone according to claim 1, further comprising a speaker, a microphone, and a clasp to mechanically connect ends of the wristband together, wherein the clasp also contains electrical user interface circuits coupled to the radiotelephone circuitry, the user interface circuits including at least one of a microphone, an interface jack, a battery charging jack, and a subscriber identification module (SIM) chip.

3. The wrist-carried radiotelephone according to claim 1, further comprising an extendable earpiece containing an electromechanical transducer disposed therein, the earpiece being electrically and mechanically coupled to the wrist-carried radiotelephone via a retractable electrical cord, the extendable earpiece is configured to be positioned between two fingers of the user such that the earpiece is located on a palm side of the user's hand and can be held up to the users ear.

4. The wrist-carried radiotelephone according to claim 1, further comprising an extendable earpiece containing an electromechanical transducer disposed therein, the earpiece being electrically coupled to the wrist-carried radiotelephone, wherein the earpiece is operable in a position from one of the group of:
    being held via a retractable electrical cord at an end of the fingers and in proximity to an ear of the user, and being worn as a wireless ring adapted to be held in proximity to the ear of the user.

5. The wrist-carried radiotelephone according to claim 1, further comprising a remote earpiece, wherein the remote earpiece is electrically coupled to the radiotelephone via one of an infrared and radio frequency wireless link.

6. The wrist-carried radiotelephone according to claim 5, wherein the remote earpiece includes a separate battery and the radiotelephone includes a charging cradle to electrically and mechanically couple to the remote earpiece when not in use so as to charge the secondary battery from the radiotelephone battery so as to allow charging of the separate battery while the radiotelephone is still in use.

7. The wrist-carried radiotelephone according to claim 1, wherein the rigid portions of the wristband are of metal so as to shield the circuitry, and the circuitry on the printed circuit boards are insulated with standoffs from the rigid portions.

8. The wrist-carried radiotelephone according to claim 1, wherein the antenna includes a configuration including one of the group of an extended loop, a collapsed loop, an extended monopole, a collapsed monopole, an extended dipole, and a collapsed dipole.

9. The wrist-carried radiotelephone according to claim 1, wherein the radiotelephone is actuated to answer an incoming call when the earpiece is removed from its cradle on the wristband.

10. A wrist-carried radiotelephone operable without removing from a user's wrist, comprising:
    a detachable housing including a display and a removable battery, the housing, display and battery being detachable without removing the wrist-carried radiotelephone from the user's wrist;
    a wristband having rigid and flexing portions, the rigid portions of the wristband are of metal so as to provide a shield for electronic circuitry the wristband being mechanically coupled to the housing;
    a wired earpiece containing an electromechanical transducer disposed therein, wherein upon removal of the earpiece from a cradle on the radiotelephone causes the radiotelephone to answer an incoming call and replacing the earpiece in the cradle serves to disconnect the call;
    a clasp for mechanically connecting ends of the wristband together, the clasp containing a microphone; and
    radiotelephone circuitry distributed within the rigid portions of the wristband and electrically insulated therefrom, the radiotelephone circuitry including circuit boards electrically interconnected by flexible interconnects contained within the rigid portions of the wristband, the circuitry being coupled to the display and the battery through the detachable housing and to the microphone through the clasp.

11. The wrist-carried radiotelephone according to claim 10, wherein the clasp also contains electrical user interface circuits coupled to the radiotelephone circuitry, the user interface circuits including at least one of an interface jack, a battery charging jack, and a subscriber identification module (SIM) chip.

12. The wrist-carried radiotelephone according to claim 10, further comprising a deployable antenna assembly that is mechanically coupled to the wristband on both sides of the detachable housing such that the antenna deploys in proximity to the detachable housing, the antenna is stowed in at least one rigid portion of the wristband on either side of the housing when not in use, and wherein when operating the radiotelephone the antenna is deployed out of the at least one rigid portion of the wristband such that the antenna assembly extends over the detachable housing.

13. The wrist-carried radiotelephone according to claim 12, wherein the antenna includes a configuration including one of the group of an extended loop, a collapsed loop, an extended monopole, a collapsed monopole, an extended dipole, and a collapsed dipole.

14. A wrist-carried radiotelephone operable without removing from a user's wrist, comprising:

- a detachable housing including a display and a removable battery, the housing, display and battery being detachable without removing the wrist-carried radiotelephone from the user's wrist;
- a wristband having rigid and flexing portions, the rigid portions of the wristband are of metal so as to provide a shield for electronic circuitry the wristband being mechanically coupled to the housing;
- an earpiece containing an electromechanical transducer disposed therein, wherein upon removal of the earpiece from a cradle on the radiotelephone causes the radiotelephone to answer an incoming call and replacing the earpiece in the cradle serves to disconnect the call;
- a charging cradle on radiotelephone, the charging cradle for electrically and mechanically coupling to the remote earpiece when not in use so as to charge the secondary battery from the battery so as to allow charging of the separate battery while the radiotelephone is still in use;
- a clasp for mechanically connecting ends of the wristband together, the clasp containing electrical user interface circuits coupled to the radiotelephone circuitry, the user interface circuits including at least one of a microphone, an interface jack, a battery charging jack, and a subscriber identification module (SIM) chip;
- a deployable antenna assembly that is mechanically coupled to the wristband on both sides of the detachable housing such that the antenna deploys in proximity to the detachable housing, the antenna is stowed in at least one rigid portion of the wristband on either side of the housing when not in use, and wherein when operating the radiotelephone the antenna is deployed out of the at least one rigid portion of the wristband such that the antenna assembly extends over the detachable housing; and
- radiotelephone circuitry distributed within the rigid portions of the wristband and electrically insulated therefrom, the radiotelephone circuitry including circuit boards electrically interconnected by flexible interconnects contained within the rigid portions of the wristband, the circuitry being coupled to the display and the battery through the detachable housing and to the microphone through the clasp.

* * * * *